UNITED STATES PATENT OFFICE.

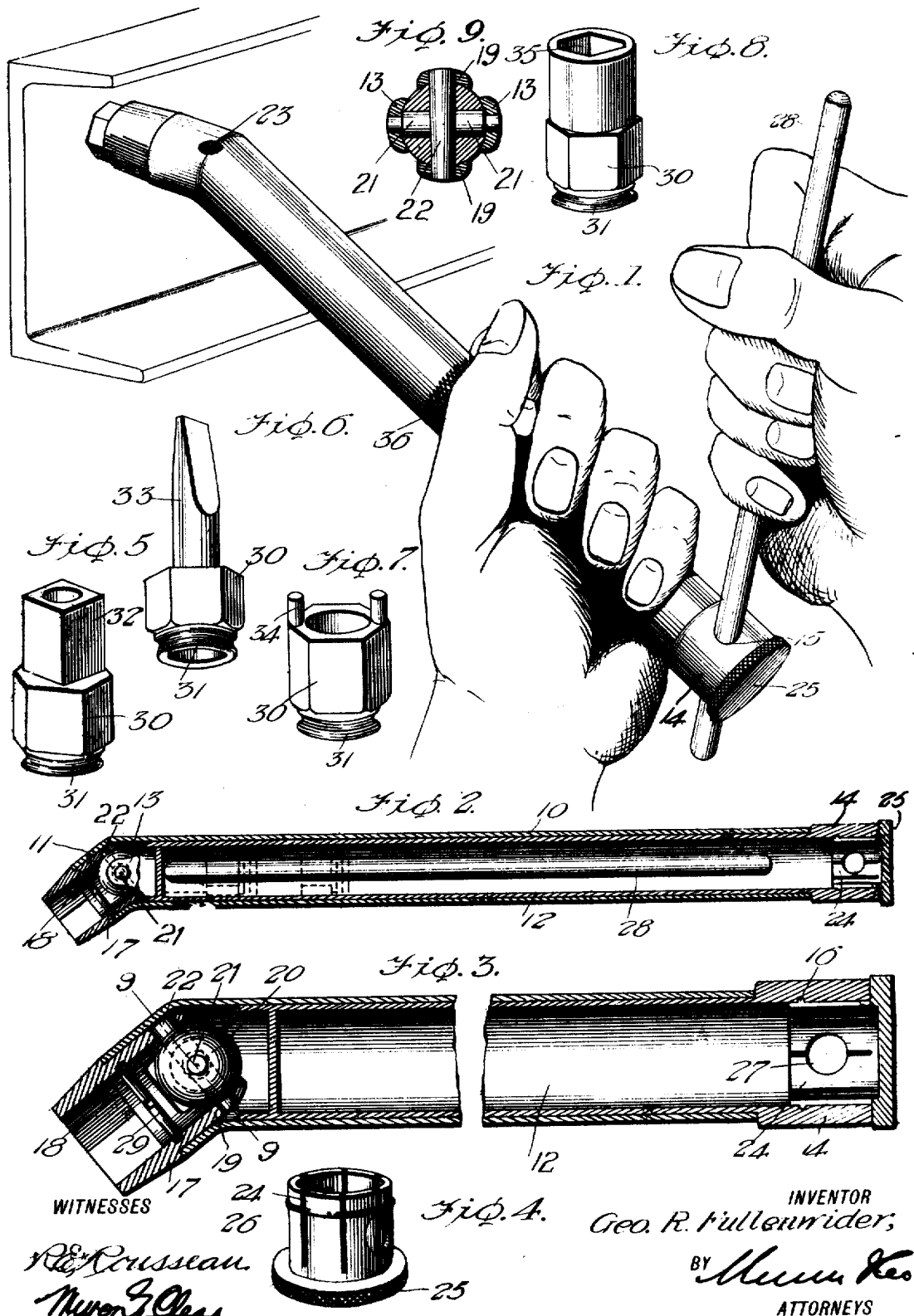

GEORGE RICE FULLENWIDER, OF FAIRFIELD, MONTANA.

ANGULAR-SOCKET WRENCH.

1,310,473.  Specification of Letters Patent.  Patented July 22, 1919.

Application filed September 10, 1918. Serial No. 253,430.

*To all whom it may concern:*

Be it known that I, GEORGE R. FULLENWIDER, a citizen of the United States, and a resident of Fairfield, in the county of Teton and State of Montana, have made certain new and useful Improvements in Angular-Socket Wrenches, of which the following is a specification.

My present invention relates to improvements in angular socket wrenches, and my object is the provision of an effective and efficient tool of this nature, which will be compact and convenient in use, and which will provide for the utilization of a plurality of implements, with means whereby to normally house such implements, provide for their independent utilization, and normally prevent loss thereof.

With this general statement in mind, my present invention resides in the features of construction, arrangement and operation to be now described in detail in connection with the accompanying drawing forming a part of this specification, and wherein:—

Figure 1 is a perspective view illustrating the practical application of my improved wrench;

Fig. 2 is a longitudinal section taken therethrough;

Fig. 3 is a similar view enlarged and partly broken away;

Fig. 4 is a detail perspective view of the end cap of the wrench;

Figs. 5 to 8 inclusive are detail perspective views illustrating different forms of implements utilized with the tool, and Fig. 9 is a detail section taken substantially on line 9—9 of Fig. 3.

Referring now to these figures, and particularly to Figs. 1, 2, and 3, my improved wrench consists of a tubular barrel or casing 10, having at one end a portion 11 extending at an angle to the longitudinal axis of the tool, the latter being open at both ends and having its main or body portion of considerably greater length than its angular extension 11. Telescoping within the body portion of the barrel or casing 10 is a tubular shaft 12, provided at one end adjacent the angular end 11 of the barrel 10 with extending apertured ears 13, diametrically opposed to one another, and having at its opposite end an enlarged head 14, which opposes and abuts the adjacent end of the body of the barrel 10 for a purpose which will be presently described, this head 14 having diametrically opposed openings 15 and having an internal groove 16, the latter of which is most plainly seen in Fig. 3.

Within the angular end 11 of the barrel 10, is telescoped a rotatable tubular engaging implement 17, having a polygonal socket 18 at its outer end and having projecting ears 19 at its inner end diametrically opposed to one another and provided with apertures so that the adjacent ends of said implement 17 and the tubular shaft 12 may be connected by a universal connection in the form of a ball 20 having openings therethrough at right angles to one another. Short studs 21 extend outwardly from certain of the openings of the ball 20 and have reduced portions projecting through the ears 13 of the shaft 12 and the implement 17 is thus permanently mounted within the angular end 11 of the barrel by a taper pin 22 which is forced through the other openings of the ball 20 and through the openings of the ears 19 of said implement 17, so as to complete the connection, the barrel or casing 10 having side openings 23, as seen in Fig. 1, to provide for the introduction of the taper pin 22, and also for its removal when desired.

The headed end of the tubular shaft 12, which of course projects beyond the adjacent end of the barrel or casing 10, receives therein the split sleeve 24 of a cap 25 normally closing the outer end of the tubular shaft, the several sections of split sleeve 24 having ribs adjacent their free ends which when the cap is in operative position engage within the groove 16 internally of head 14, in order to hold the cap and prevent accidental displacement and loss thereof.

Certain of the sections of the split sleeve 24 also have side recesses forming openings 27 at diametrically opposite points of the sleeve to aline with the openings 15 of the head 14, although of slightly reduced diameter with respect to the latter openings. The handle of the wrench is in the nature of a cylindrical rod 28, as seen in Figs. 1 and 2, in the former figure in active position, and in the latter position in inactive position, and this handle may be extended at either end through the openings 15 of the head 14 and consequently through the openings 27 of the split sleeve 24, the latter of which being of reduced diameter serve to bring about a clasping of certain of the sections of the split sleeve upon the handle so as to frictionally grip the latter and hold it in various positions against displacement and loss while in use.

In addition to its polygonal socket 18, the permanent socket implement 17 has an inner annular groove which supports a spring clamping ring 29 in order to hold various engaging implements in active position against danger of displacement and loss. Several of these implements are shown in Figs. 5 to 8, inclusive, and each has a polygonal body 30 with a reduced annularly grooved extension 31 at one end thereof, the body 30 in each case interfitting the polygonal socket 18 and the reduced extension 31 being engageable by the split ring 29.

The body 30 of the implement shown in Fig. 5, has a squared extension 32 to interfit a nut having a squared socket. The body 30 of the implement shown in Fig. 6 has a screw driver 33, the body 30 of Fig. 7 has valve engaging pins 34 for use in grinding or seating valves and the body 30 of Fig. 8 has a polygonal socket 35 of a different size than that of the socket 18 of the permanent implement 17.

Each of the implements shown in Figs. 5 to 8, inclusive, with the exception of the implement of Fig. 6 is tubular, so as to receive the handle 28 therethrough when the several detachable implements are housed within the hollow shaft 12, as shown in dotted lines in Fig. 2, the handle 28 being also housed therein and extending through such implements. The handle, it will be noted, is of reduced length as compared to that of hollow shaft 12, so that space thus remains for the reception of the screw driver member of Fig. 6.

Thus it is obvious that when it is desired to use the tool, the cap 25 is first pulled out and the handle 28 removed from the space within the hollow shaft 12 along with the several implements also housed therein, and from which the implement desired for use is selected. This implement is then thrust within the permanent socket member 17, cap 25 is replaced, and handle 28 is extended to the desired point through the openings 15 of the head 14, as seen in Fig. 1. The detachably held implement is then placed in connection with either a nut, valve, screw or the like, as the case may be, and with the barrel or casing firmly held to support the tool in proper position, as by means of the operator grasping its intermediate knurled exterior portion 36, as seen in Fig. 1, the handle 28 may be grasped and by rotating the head 14 a similar movement is transmitted through the tubular shaft 12 and through the universal connection 2 to the permanent socket member 17, and thus through the polygonal socket of the latter to the detachably held implement.

It is obvious therefore that my invention provides a comparatively simple and inexpensive tool, which may be economically and readily utilized for various purposes, for which implements of this character are intended, as well as one which will be strong and durable in use and effective and efficient in its results.

It is obvious also that in order to properly maintain the universal connection at the angle between the body of the barrel or casing 10 and its extension 11, it is necessary that the natural thrust of the hollow shaft 12 by the person operating the same in use must be taken up, this function, being in the present construction performed by the enlarged head 14 at the outer end of the said tubular shaft, which abuts the adjacent end of the said barrel or casing.

I claim:—

1. A device of the character described comprising a continuous hollow barrel or casing having an angular extension at one end integral and rigid therewith, a socket member rotatably interfitting the said angular portion, a hollow shaft within the said barrel or casing having an enlarged head at its outer end abutting the adjacent end of the barrel casing, and a universal connection between the inner end of the said hollow shaft and the adjacent end of the said socket member.

2. A wrench including a hollow cylindrical barrel having an angular portion at one end and a socket member rotatably interfitting the angular portion thereof, a hollow shaft rotatable within the barrel casing and projecting beyond the opposite end thereof, a universal connection between the inner end of the hollow shaft and the said socket member, said projecting portion of said shaft having diametrically opposed openings, a handle in the form of a rod movable into and through the said openings, and a removable cap for normally closing the end of the hollow shaft.

3. A wrench including a hollow cylindrical barrel having an angular portion at one end and a socket member rotatably interfitting the angular portion thereof, a hollow shaft rotatable within the barrel casing and projecting beyond the opposite end thereof, a universal connection between the inner end of the hollow shaft and the said socket member, said projecting portion of said shaft having diametrically opposed openings, a handle in the form of a rod movable into and through the said openings, and a removable cap for normally closing the end of the hollow shaft, said cap having means to grip the handle when the latter is thrust through the said openings of the shaft, for the purpose described.

4. A wrench comprising a continuous cylindrical barrel or casing having an angular portion at one end, a hollow shaft rotatably interfitting the barrel or casing, and having an enlarged head beyond and in engagement with the opposite end of said barrel or casing, a socket member rotatably interfitting the angular portion of the barrel or casing, a universal connection between the said socket member and the said hollow shaft, and an implement removably interfitting the said socket member and of a diameter less than that of the hollow shaft.

5. A wrench comprising a continuous cylindrical barrel or casing having an angular portion at one end, a hollow shaft rotatably interfitting the barrel or casing, and having an enlarged head beyond and in engagement with the opposite end of said barrel or casing, a socket member rotatably interfitting the angular portion of the barrel or casing, a universal connection between the said socket member and the said hollow shaft, an implement removably interfitting the said socket member and of a diameter less than that of the hollow of the said shaft, and a removable cap normally closing the outer headed end of the said hollow shaft.

6. A wrench comprising a continuous cylindrical barrel or casing having an angular portion at one end, a hollow shaft rotatably interfitting the barrel or casing, and having an enlarged head beyond and in engagement with the opposite end of said barrel or casing, a socket member rotatably interfitting the angular portion of the barrel or casing, a universal connection between the said socket member and the said hollow shaft, and an implement arranged to interfit the said socket member, said socket member having an internal polygonal portion and an internal clamping means, and said implement having a polygonal portion and a grooved extension respectively for projection within the inner polygonal portion and engagement by said clamping means of the socket member, for the purpose described.

7. A wrench comprising a cylindrical barrel or casing having an angular portion at one end, a shaft rotatable within said barrel and projecting beyond the opposite end thereof, a rotatable member within the angular portion of the barrel, having a polygonal socket and an internal groove, a universal connection between said member and the shaft, a split clamping ring within the groove of the said rotatable member, and an implement within the rotatable member, having a polygonal portion and a grooved extension to coact respectively with the polygonal socket and clamping ring of the rotatable member, for the purpose described.

8. A wrench comprising a cylindrical barrel or casing having an angular portion at one end, and a rotatable socket member within the said angular portion, a hollow shaft rotatable within the barrel or casing, a universally movable connection between the inner end of the said shaft and the said socket member, said shaft extending at its opposite end beyond the respective end of the barrel or casing and having a head provided with diametrically opposed openings, a cap for closing the outer end of the hollow shaft having a split sleeve telescoping within the said head of the shaft, certain of the sections of said split sleeve having recesses forming openings to aline with the openings of the head, and of reduced diameter with respect to the diameter of the said head openings and a handle consisting of a rod for extension through said alined openings, as described.

GEORGE RICE FULLENWIDER.